United States Patent
Sprague

(10) Patent No.: US 10,322,383 B2
(45) Date of Patent: Jun. 18, 2019

(54) RADIAL FLOW PROCESSOR AND METHOD FOR USING SAME

(71) Applicant: Fluid Quip, Inc., Springfield, OH (US)

(72) Inventor: Allison Sprague, Prescott (CA)

(73) Assignee: Fluid Quip, Inc., Springfield, OH (US)

( * ) Notice: Subject to any disclaimer, the term of this patent is extended or adjusted under 35 U.S.C. 154(b) by 0 days.

(21) Appl. No.: 15/554,892

(22) PCT Filed: Feb. 26, 2016

(86) PCT No.: PCT/US2016/019693
§ 371 (c)(1),
(2) Date: Aug. 31, 2017

(87) PCT Pub. No.: WO2016/144566
PCT Pub. Date: Sep. 15, 2016

(65) Prior Publication Data
US 2018/0043318 A1 Feb. 15, 2018

Related U.S. Application Data

(60) Provisional application No. 62/129,426, filed on Mar. 6, 2015.

(51) Int. Cl.
*B01F 5/02* (2006.01)
*B05B 7/00* (2006.01)
(Continued)

(52) U.S. Cl.
CPC .............. *B01F 5/0268* (2013.01); *B01J 19/00* (2013.01); *B01J 19/24* (2013.01); *B05B 7/00* (2013.01);
(Continued)

(58) Field of Classification Search
CPC .................. B01F 5/0268; B01F 2215/0036; B01F 5/02; B01J 19/24; B01J 2219/24
(Continued)

(56) References Cited

U.S. PATENT DOCUMENTS 2,021,092 A * 11/1935 Teliet ..................... B28C 5/026
366/131
2,865,619 A * 12/1958 Haltmeier .............. B01D 47/06
261/116
(Continued)

FOREIGN PATENT DOCUMENTS

FR  1181577 A * 6/1959 ............ B01F 5/0268
GB  365513 A * 1/1932 ............ B01F 3/0446
(Continued)

OTHER PUBLICATIONS

PCT Office, International Preliminary Report on Patentability issued in PCT/US2016/019693 dated Sep. 12, 2017, 5 pages.
(Continued)

*Primary Examiner* — Charles Cooley
(74) *Attorney, Agent, or Firm* — Wood Herron & Evans LLP

(57) ABSTRACT

A liquid treatment apparatus (10) for processing a liquid includes an inlet nozzle (12) having an orifice (16) for directing a flow of liquid through the orifice (16) to define a fluid jet, and a concial diffuser (18) including a tip (20), a base portion (22), and a curved surface (26) therebetween. The conical diffuser (18) is generally aligned with the orifice (16) such that the fluid jet impacts upon the tip (20) of the conical diffuser (18). Moreover, the curvature of the curved surface (26) is selected to maintain a substantially constant Froude number of the liquid along the conical diffuser (18).

13 Claims, 4 Drawing Sheets

(51) Int. Cl.
*B01J 19/00* (2006.01)
*B01J 19/24* (2006.01)

(52) U.S. Cl.
CPC ... *B01F 2215/0036* (2013.01); *B01J 2219/24* (2013.01)

(58) Field of Classification Search
USPC .......................................... 366/174.1, 175.2
See application file for complete search history.

(56) References Cited

U.S. PATENT DOCUMENTS

| | | | | | |
|---|---|---|---|---|---|
| 3,218,133 | A | * | 11/1965 | Ebner | B01D 9/0036 422/252 |
| 4,162,971 | A | * | 7/1979 | Zlokarnik | B01F 3/0876 210/620 |
| 4,381,268 | A | | 4/1983 | Muller et al. | |
| 4,534,862 | A | * | 8/1985 | Zlokarnik | C02F 1/24 209/170 |
| 4,659,464 | A | * | 4/1987 | Long, Jr. | B01F 3/0473 210/221.1 |
| 4,729,665 | A | * | 3/1988 | Goudy, Jr. | B01F 5/0604 261/DIG. 80 |
| 5,183,335 | A | * | 2/1993 | Lang | B01F 5/045 210/738 |
| 5,564,825 | A | * | 10/1996 | Burt | B01F 3/0865 137/533.29 |
| 6,036,356 | A | | 3/2000 | Yang et al. | |
| 6,145,759 | A | | 11/2000 | Susa | |
| 6,422,735 | B1 | * | 7/2002 | Lang | B01F 3/0873 366/162.4 |
| 6,684,801 | B1 | * | 2/2004 | Kuklinski | B63B 1/38 114/67 A |
| 7,059,591 | B2 | | 6/2006 | Bortkevitch et al. | |
| 7,997,300 | B1 | | 8/2011 | Wise et al. | |
| 2001/0047836 | A1 | * | 12/2001 | Welker | F15D 1/04 138/39 |
| 2002/0148222 | A1 | * | 10/2002 | Zaslavsky | F03D 1/00 60/398 |
| 2004/0246813 | A1 | * | 12/2004 | Lang | B01F 3/0873 366/162.4 |
| 2008/0309708 | A1 | * | 12/2008 | Teshima | B01F 3/12 347/40 |
| 2009/0318586 | A1 | * | 12/2009 | Teshima | B01F 5/0256 523/315 |
| 2012/0267294 | A1 | * | 10/2012 | Herman | B01D 29/232 210/137 |
| 2013/0215706 | A1 | * | 8/2013 | Markert | B01F 3/0807 366/175.2 |
| 2014/0093612 | A1 | * | 4/2014 | Montserrat Carreras | A23C 9/123 426/43 |
| 2018/0043318 | A1 | * | 2/2018 | Sprague | B01F 5/0268 |

FOREIGN PATENT DOCUMENTS

| | | | |
|---|---|---|---|
| GB | 365513 A | 1/1932 | |
| JP | 02280824 A | 11/1990 | |
| WO | WO-2006005828 A1 * | 1/2006 | ............ B01F 5/0268 |

OTHER PUBLICATIONS

Justin Lennon, Thesis Application of Particle Image Velocimetry to the Hydraulic Jump, the Pennsylvania State University, May 2004.
Andre Bakker, Applied Computational Fluid Dynamics, Lecture 9—Kolmogorov's Theory, Fluent Inc., 2002.

* cited by examiner

RADIAL FLOW PROCESSOR AND METHOD FOR USING SAME

TECHNICAL FIELD

The invention relates to a liquid treatment apparatus for treating a liquid medium and, more particularly, to an apparatus and method for enhancing reaction rates for diffusion-controlled chemical reactions.

BACKGROUND

Many industrial processes rely on various chemical reactions in a liquid medium to achieve a certain end product. Accordingly, manufacturers and others that perform these industrial processes continually seek improvements to these processes so as to improve their efficiency and provide a cost benefit. By way of example, increasing the collision frequency in chemical reactions occurring in a liquid medium may result in a decrease in processing time, which may lead to an increase in overall production and decrease in operating costs, and/or a decrease in chemical consumption in the liquid medium for achieving the desired result which may also reduce operating costs. Increasing collision frequency via increasing shear rates may also serve to increase surface area of weakly bonded particulate matter and/or flocs. These are only exemplary and, depending on the specific application, many other benefits may be gained by increasing shear rates.

As an example, two types of industrial applications that may benefit from increased diffusion rates are reactions involving catalysts and enzymes.

Current static mixers do not sufficiently utilize available energy to optimize shear rates in order to enhance reactions. For example, static mixers sold under the trademark Kenics do not effectively generate a thin liquid film while maintaining laminar flow and increasing acceleration, such that these mixers do not provide optimized shear rates. Therefore, a need exists for a liquid flow processor which enhances reactions by optimizing shear rates.

SUMMARY

A liquid treatment apparatus for processing a liquid includes an inlet nozzle having an orifice for directing a flow of liquid through the orifice to define a fluid jet, and a concial diffuser including a tip, a base portion, and a curved surface therebetween. The conical diffuser is generally aligned with the orifice such that the fluid jet impacts upon the tip of the conical diffuser. Moreover, the curvature of the curved surface is selected to maintain a substantially constant Froude number of the liquid along the conical diffuser.

In one embodiment, a profile of the conical diffuser, when viewed in cross section, is defined by a quarter of an ellipse. In a more particular embodiment, the ellipse is defined by the following equations:

$$a = r_0 \times \sqrt[5]{\frac{Fr^8}{2}}$$

$$b = \frac{a^2}{r_0 \times Fr^2}$$

where
a=the major radius of the ellipse
b=the minor radius of the ellipse
$r_0$=the radius of the orifice
Fr=the desired Froude number.

In one embodiment, the inlet nozzle may include a curved inlet wall. Moreover, the base portion includes a rear wall on a side of the base portion opposite the tip that is generally planar. Alternatively, the rear wall may be generally curved, wherein the curve is characterized by a substantially constant radius of curvature. Furthermore, the liquid treatment apparatus may include a mounting plate to which the conical diffuser is mounted. The mounting plate may include one or more apertures for allowing liquid to pass through the mounting plate. The liquid treatment apparatus may include a plurality of inlet nozzles and a plurality of conical diffusers, wherein each conical diffuser is generally aligned with a corresponding orifice of an inlet nozzle.

In another embodiment, a system for processing a liquid includes a tank for holding a liquid medium, a pump, and a liquid treatment apparatus as described above, wherein the pump is configured to direct the liquid in the tank through the liquid treatment apparatus. The system may further include a recirculation loop for directing liquid treated by the liquid treatment apparatus back to the tank.

In yet another embodiment, a method of treating a liquid includes directing a flow of liquid through an orifice to define a fluid jet; impacting the fluid jet upon a conical diffuser having a tip, a base portion, and a curved surface therebetween; and maintaining a substantially constant Froude as the liquid flows from the tip toward the base portion of the conical diffuser.

In accordance with the method, maintaining a substantially constant Froude number further comprises selecting the curvature of the curved surface in order to maintain a substantially Froude number. In one embodiment, selecting the curvature of the curved surface further comprises defining a profile of the conical diffuser, when viewed in cross section, to be a quarter of an ellipse. By way of example, defining the profile of the conical diffuser further comprises defining the ellipse by the following equations:

$$a = r_0 \times \sqrt[5]{\frac{Fr^8}{2}}$$

$$b = \frac{a^2}{r_0 \times Fr^2}$$

where
a=the major radius of the ellipse
b=the minor radius of the ellipse
$r_0$=the radius of the orifice
Fr=the desired Froude number.

According to an embodiment, the method further includes (a) pumping a supply of liquid from a tank to the orifice; (b) directing the liquid that has impacted the conical diffuser back to the tank; and repeating steps (a) and (b) one or more times.

DETAILED DESCRIPTION

Figure 1:
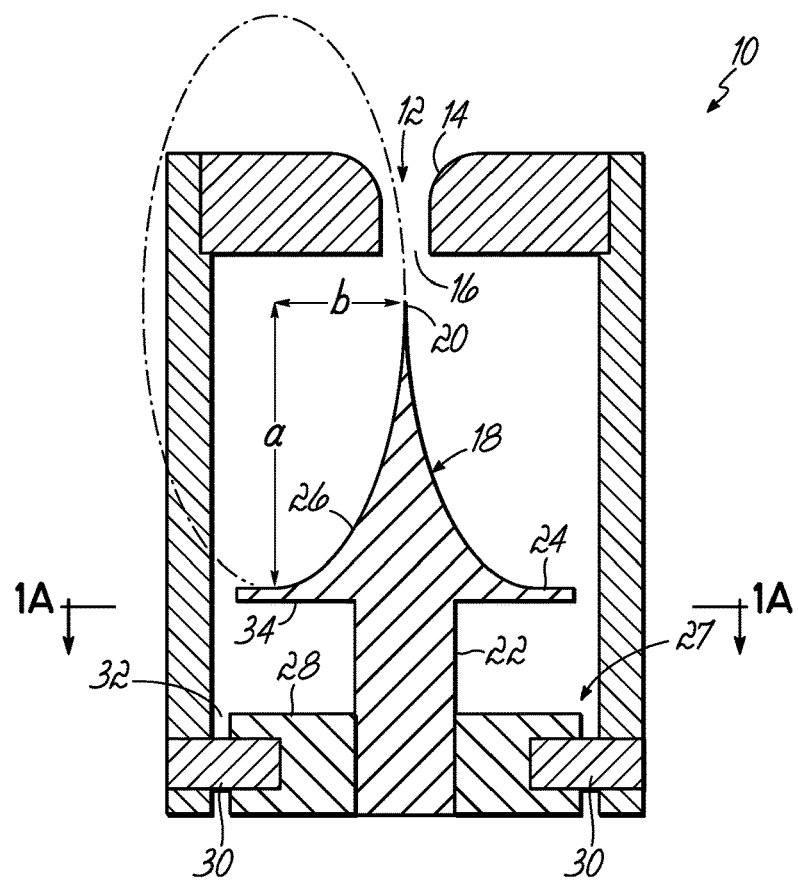
FIG. 1 is a cross sectional view of an exemplary radial flow processor in accordance with the principles of the present invention.

When a liquid is subjected to shear, the large eddies initially formed subsequently break down into somewhat smaller eddies which in turn break down into successively smaller eddies in an energy cascade. The rate of kinetic energy dissipation due to shear is directly proportional to the cube of the initial velocity and inversely proportional to a characteristic dimension, such as flow channel diameter or film thickness/depth of flow. If $U_0$ represents the average flow velocity and $L_0$ represents the characteristic dimension, then the energy dissipation rate may be approximated as $\varepsilon \sim U_0^3/L_0$. Thus, with regards to the characteristic dimension, for a given flow velocity, reducing the characteristic dimension increases the energy dissipation rate, which may then increase the collision frequency.

For open channel flow over a flat surface, as $U_0$ becomes greater or as $L_0$ becomes smaller, the flow regime has a greater tendency to transition from laminar to turbulent. The conditions under which the transition may occur may be calculated utilizing the Froude number. The Froude number is a ratio of the inertial and gravitational forces. If $U_0$ represents the velocity of the fluid, $L_0$ represents the depth of the fluid, and G is the acceleration due to gravity, then the Froude number $$Fr = \frac{U_0}{\sqrt{GL_0}}.$$

If the Froude number is substantially less than 1, then the flow tends to be laminar. If the Froude number is substantially greater than 1, then the flow will tend to suddenly transition to turbulent flow. When the flow regime transitions to turbulent flow, the depth of the fluid will tend to suddenly increase. The sudden change in depth is referred to as hydraulic jump. Shear stresses within the fluid are reduced downstream of the jump due to the reduction in net flow velocity resulting from the increase in flow area and because of the increase in film thickness. The length of the transition zone from laminar to turbulent flow will tend to become shorter as the Froude number is increased.

Note that the Froude number was originally developed for open channel flow where gravity provided the primary resistance to increase in surface elevation which would result from hydraulic jump. Under other flow conditions where the fluid is subjected to rapid change in velocity, the primary acceleration forces may be due more to the rapid change in fluid velocity rather than acceleration due to gravity. Under such conditions, it would become necessary to replace acceleration due to gravity (G) with an expression for the acceleration generated due to the change in velocity. This instantaneous acceleration would be equal to $U^2/R$, where U represents the fluid velocity and R represents the instantaneous radius of curvature of the flow path.

If the open flow channel were to curve "upward" towards the free surface of the fluid, the acceleration resulting from the change in flow direction would be added to G. This tends to increase the resistance to the formation of a hydraulic jump. If $U_0$ represents the velocity of the fluid and R represents the radius of curvature of the flow path, the rate of acceleration associated with the change in flow path direction would be $U_0^2/R$. Reducing the radius of curvature would tend to increase the rate of acceleration, which may be increased to match the shear stresses resisting flow (which tend to cause the fluid to pile up on itself and form a hydraulic jump). Moreover, in applications where the flow is not necessarily horizontal and/or when $U_0^2/R$ is significantly greater than G, the initial Froude number may be approximated by replacing G with $U_0^2/R$ so that $$Fr = \frac{U_0}{\sqrt{\frac{U_0^2 L_0}{R}}} = \sqrt{\frac{R}{L_0}}.$$

Therefore, to maintain a substantially constant Froude number as the fluid film thickness is reduced, the radius of curvature must be reduced by the same ratio as the film thickness.

In a 2004 Thesis entitled "Application of Particle Image Velocimetry to the Hydraulic Jump" by Justin M. Lennon, the author described how the Froude number may be utilized to control the formation and location of hydraulic jumps in open channel flows. Referring to table 4.2 and FIG. 4.6 of the thesis, it would appear that at the velocities he was testing, with a Froude number of approximately 3, the distance from the inlet to the hydraulic jump was approximately 12.5 times the depth of flow. Under these conditions, based upon the Froude number Fr=3, $$\sqrt{\frac{R}{L_0}} = 3$$

such that $R=9L_0$ or $L_0=0.11R$.

Note that for this example, if the Froude number were to be greater than 3 at some location upstream of the hydraulic jump, but were to have a value of 3 at the jump, thickness of the film immediately prior to the jump would tend to be greater than if the Froude number were to be held constant at 3 (because of the additional shear energy input within the high Froude number section). Similarly, if the Froude number were to be less than 3 at some point upstream of the hydraulic jump, but were to have a value of 3 at the jump, the distance from the initial point of shear to the hydraulic jump would be increased, and again the thickness of the film immediately prior to the hydraulic jump would be greater than if the Froude number were to be held constant at 3 (because of the additional shear energy input within the longer low Froude number section).

By maintaining a constant and optimal Froude number as the film thickness is varied, the film thickness may be minimized prior to the formation of a hydraulic jump, and thus the shear energy dissipation rate may be maximized to optimize the reaction rate. If the depth of flow (represented by $L_0$) were to be reduced and the flow velocity were to remain constant, to maintain the same Froude number, it would be necessary to reduce the radius of curvature. Thus, a means is required to simultaneously reduce the depth of flow, by maintaining a constant Froude number, while decreasing the radius of curvature.

Hypothetically, if a round jet of fluid were to impact upon a flat plate, the flow would be forced to flow radially from the center of impact. This would serve to reduce the depth of flow as the "width" of the flow path would increase with diameter. However, this does not provide controlled change in "radius of curvature" of the flow path. In fact, the radius of curvature would be minimum near the point where the depth of flow is maximum rather than where it achieves minimum depth. Similarly, if a round jet were to impact upon the tip of a conical diffuser whose diameter increased in a linear manner away from the tip, the "width" of the flow path would increase linearly with distance from the tip. However, the "radius of curvature" would not decrease in the desired manner to minimize film thickness prior to the formation of a hydraulic jump.

However, if a round jet were to impact upon the tip of a conical diffuser whose diameter increased more rapidly further from the tip, then the "radius of curvature" of the flow path would tend to be reduced further from the tip and the rate of acceleration would increase. In fact, if, when viewed in cross section, the radius of the conical diffuser were to expand substantially in the form of a quarter ellipse such that the ellipse's largest radius of curvature would be near the tip and the ellipse's smallest radius of curvature would be at the base where the flow path transitioned to pure radial flow, it would be possible to maintain a substantially constant and specific Froude number by adjusting the dimensions of the ellipse.

Under optimum conditions, the hydraulic jump would occur at the point where the flow path transitions to pure radial flow. Due to variations in fluid characteristics, surface roughness and other factors, the optimum Froude number may vary for differing applications. This in turn may result in different optimal diffuser surface profiles, depending upon the application.

Therefore, turning now to FIG. 1, a radial flow processor 10 may include an inlet nozzle 12 having a curved wall 14 and an orifice 16. The radial flow processor 10 may further include a conical diffuser 18 arranged in line with the axis of the inlet nozzle 12, such that a fluid jet flowing through the orifice 16 may impact upon the tip 20 of the conical diffuser 18. In addition to the tip 20, the conical diffuser 18 may have a constant diameter portion 22, a base portion 24 and a curved surface 26 extending between the tip 20 and the base portion 24, such that the rate of increase of the diameter of the conical diffuser 18 increases more rapidly than a linear cone further from the tip 20. For example, the conical diffuser 18 may exhibit a substantially quarter-elliptical profile when viewed in cross section. In other words, the shape of the conical diffuser 18 may be substantially defined by a quarter of an ellipse (shown in phantom). In particular, the curvature of the curved surface 26 may be defined by the radius of curvature of the ellipse, which is a function of the major radius, or semi-major axis length a, and the minor radius, or semi-minor axis length b, of the ellipse. Therefore, the dimensions a, b of the ellipse may be selected to adjust the curvature of the curved surface 26 in order to maintain a substantially constant and specific Froude number. Overall, the Froude number should be within 5% of the desired value, but localized variations should be smaller to avoid surface roughness which would induce excessive turbulence. As previously stated, this may minimize film thickness prior to the formation of a hydraulic jump, and may therefore maximize kinetic energy dissipation rate due to shear to optimize chemical or physical reaction rates.

The parameters of the required ellipse may be calculated as follows. The radius of the orifice 16 of the inlet nozzle 12 may be designated as $r_0$ and the initial trial Froude number Fr chosen as 3 (this has proven to be a good starting point for optimization). However, it will be appreciated that any suitable Froude number may be chosen. For example, a Froude number between approximately 2 and 10 may be chosen. Preferably, a Froude number between approximate 3 and 6 may be chosen. The thickness $L_0$ of the inlet stream at the tip 20 of the conical diffuser 18 equals the inlet jet radius $r_0$. Thus, at the tip 20 of the diffuser 18, $L_0=r_0$. If $$Fr = \sqrt{\frac{R}{L_0}},$$

and $L_0=r_0$, by substituting $r_0$ for $L_0$, $$Fr = \sqrt{\frac{R}{r_0}}.$$

Then by squaring both sides of the equation and then multiplying both sides by $r_0$, the required radius of curvature R, at the tip 20 of the diffuser 18 becomes $R=r_0 \times Fr^2$. This is also equal to the major radius of curvature $R_{max}$ of the ellipse. The largest radius of curvature of an ellipse $R_{max}=a^2/b$. Setting these equations equal, the minor radius b may be expressed in terms of the major radius a, such that $$b = \frac{a^2}{r_0 Fr^2}.$$

As the incoming stream of fluid passes over the curved surface 26 of the conical diffuser 18, moving away from the tip 20, the diameter of the flow path increases and the film thickness L decreases. At the point where the flow first becomes purely radial, at diffuser radius=b, the film thickness, designated $L_b$, can be calculated as the area of the inlet jet divided by the circumference at a radius=b, so that $$L_b = \frac{\pi r_0^2}{2\pi b} = \frac{r_0^2}{2b}.$$

To maintain a substantially constant Froude number, the radius of curvature at b must be $$R_b = L_b \times Fr^2 = \frac{r_0^2}{2b} \times Fr^2.$$

The minimum radius of curvature of an ellipse $R_{min}=b^2/a$. Thus, $$b^2/a = \frac{r_0^2}{2b} \times Fr^2.$$

Substituting $$\frac{a^2}{r_0 \times Fr^2}$$

for b, and simplifying, $$a = \sqrt[5]{\frac{(r_0 \times Fr^2)^3 \times r_0^2 \times Fr^2}{2}} = \sqrt[5]{\frac{r_0^5 \times Fr^8}{2}} = r_0 \times \sqrt[5]{\frac{Fr^8}{2}}.$$

As an example, if $r_0$=0.125 centimeters and Fr=3, then a=0.631 centimeters and b=0.354 centimeters.

It should be appreciated that surface roughness of the conical diffuser 18 should be held to less than 5% of L at a given point to avoid premature transition of the flow regime from laminar to turbulent. Thus, local variations in the radius of curvature R should be held to less than 5% of L at that point, or 0.05 R/$Fr^2$.

It should also be appreciated that the conical diffuser 18 may extend radially past radius=b. In one embodiment, the Froude number may be selected so that a hydraulic jump may occur at radius=b. This may provide the minimum film thickness for a given inlet nozzle diameter and the maximum shear energy dissipation rate.

It should also be appreciated that the optimal shear energy dissipation rate may vary inversely with inlet nozzle diameter. For example, reducing the inlet diameter by 50% may permit the shear energy dissipation rate to be doubled while maintaining the same Froude number.

Figure 1A:
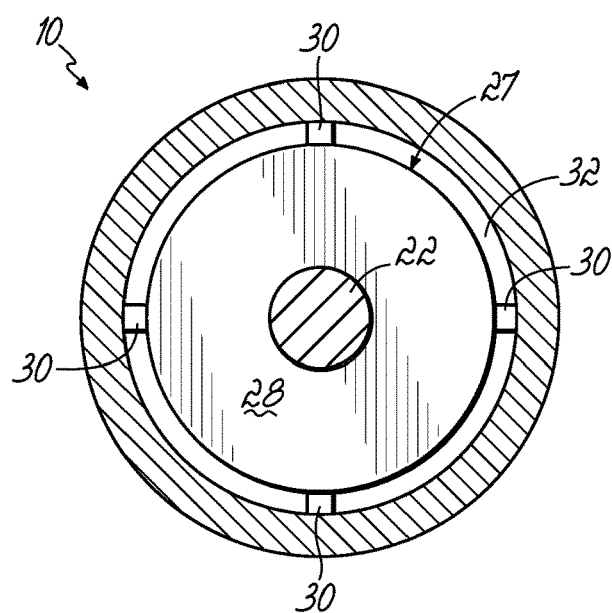
FIG. 1A is a cross sectional view of the radial flow processor shown in FIG. 1 taken along line 1A-1A.
Figure 1B:
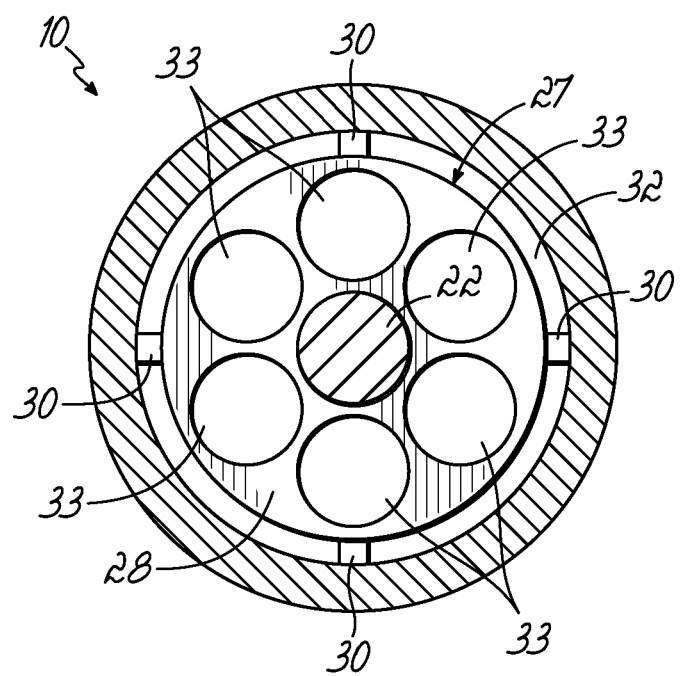
FIG. 1B is a cross sectional view of an alternative embodiment of the radial flow processor shown in FIG. 1A in accordance with the principles of the present invention.

The conical diffuser 18 may be mounted within the radial flow processor 10 by way of a mounting assembly 27. For example, as shown in FIG. 1, the constant diameter portion 22 of the conical diffuser 18 may be attached to a mounting plate 28, which may be held in place by spokes 30. The spokes 30 may be spaced apart to provide outlet apertures 32, as shown in FIG. 1A. Therefore, fluid exiting the radial flow processor 10 may flow around the mounting plate 28 and between the spokes 30 through outlet apertures 32. In addition or alternatively, apertures 33 may be provided in the mounting plate 28 for allowing fluid to flow therethrough (See FIG. 1B).

Figure 2:
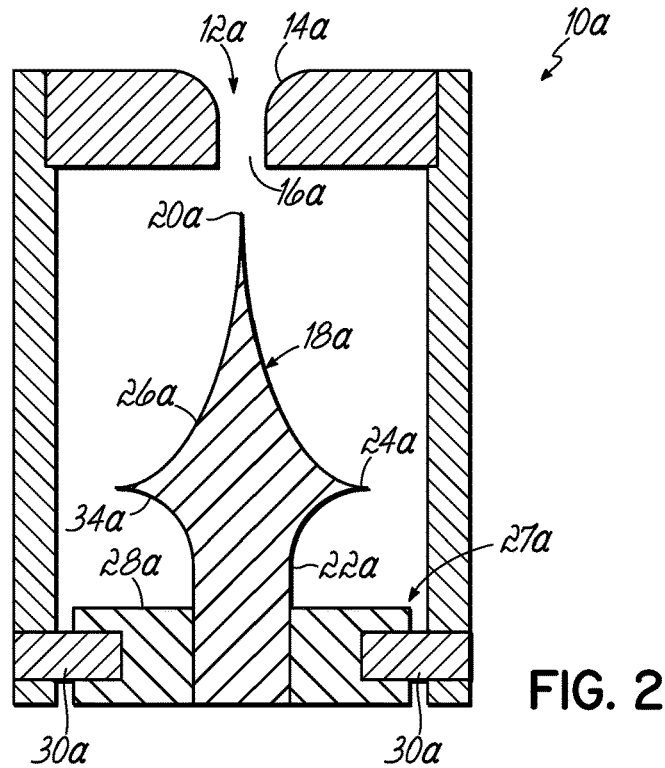
FIG. 2 is a cross sectional view of an alternative exemplary radial flow processor in accordance with the principles of the present invention.

As shown in FIG. 1, in one embodiment, the base portion 24 may include a flat-surfaced or generally planar bottom side 34 which intersects the constant diameter portion 22 of the diffuser 18 at a substantially right angle. Alternatively, as shown in FIG. 2, where like numerals represent like features, in one embodiment, the base portion 24a may include a curved bottom side 34a having a radius for smoothly transitioning to the constant diameter portion 22a. For example, the bottom side 34a may have a substantially constant radius. The radius may provide fluid flowing from below the base portion 24a with a radial velocity component, and thus may reduce back pressure at diffuser radius=b. This may permit the use of a greater Froude number which in turn may result in a thinner fluid film at diffuser radius=b and a higher kinetic energy dissipation rate.

In one embodiment, the surfaces of the radial flow processor 10 subject to contact with the fluid may be constructed of a material having a high surface energy. For example, the inlet nozzle 12, conical diffuser 18, mounting plate 28, spokes 30, and/or the interior walls of the radial flow processor 10 may be constructed of nickel, platinum, copper, or the like, or any other suitable material having a high surface energy. Alternatively, such components may be constructed of a different material and the surfaces of the components that are exposed to the fluid may be coated with a material having a high surface energy. It will be appreciated that by providing a surface constructed of a material having a high surface energy, chemical reactions in the fluid contacting the surface may be enhanced by the high surface turnover rate. In this manner, the surface may advantageously act as a catalyst for promoting chemical reactions in the fluid.

In another embodiment, the radial flow processor 10 may be constructed such that the electrical charge on the surface of the conical diffuser 18 (e.g., the curved surface 26) may be different from the electrical charge on the surrounding surfaces (e.g., the interior walls of the radial flow processor 10). In this manner, efficient charge transfer may be provided to the fluid.

Figure 3:
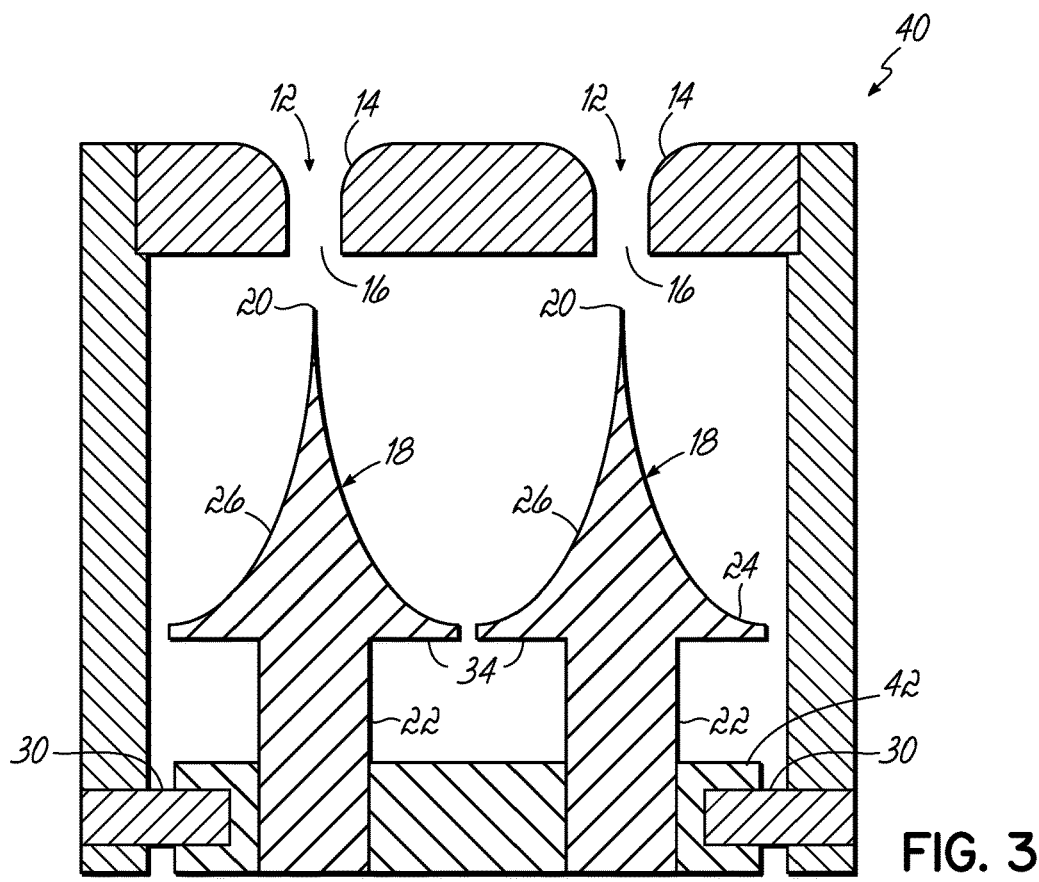
FIG. 3 is a cross sectional view of an alternative exemplary radial flow processor in accordance with the principles of the present invention.

In one embodiment, a plurality of conical diffusers 18 may be installed in parallel in a manifold 40 to obtain a desired flow rate while maintaining an optimal energy dissipation rate, as shown in FIG. 3. In one embodiment, the conical diffusers 18 may each be mounted on a single mounting plate 42, which may be held in place within the manifold 40 by spokes 30.

Figure 4A:
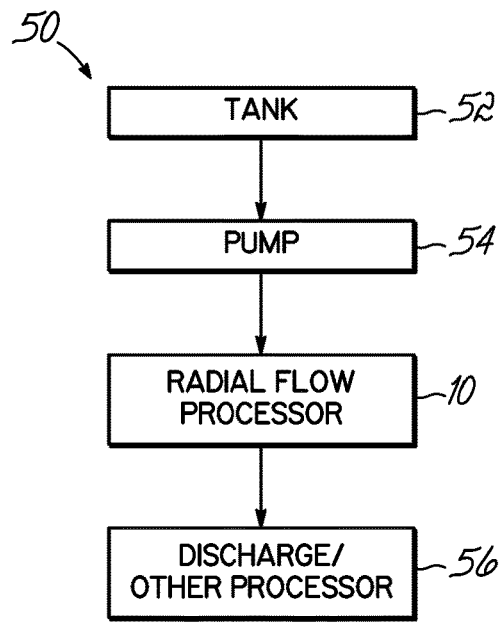
FIG. 4A is a schematic illustration of a single-pass flow configuration in accordance with the principles of the present invention.

In one embodiment, a radial flow processor 10 may be incorporated into a single-pass flow configuration 50, as shown in FIG. 4A. For example, a processing fluid may be drawn from a tank 52 by a pump 54, such as a centrifugal pump. The processing fluid may be pumped into a radial flow processor 10, where the fluid jet may impact upon the tip 20 of a conical diffuser 18. After the fluid passes over the conical diffuser 18, the fluid may exit the radial flow processor 10 via outlet apertures 36. The fluid may then be directed through a discharge or other processor 56, depending on the application.

Figure 4B:
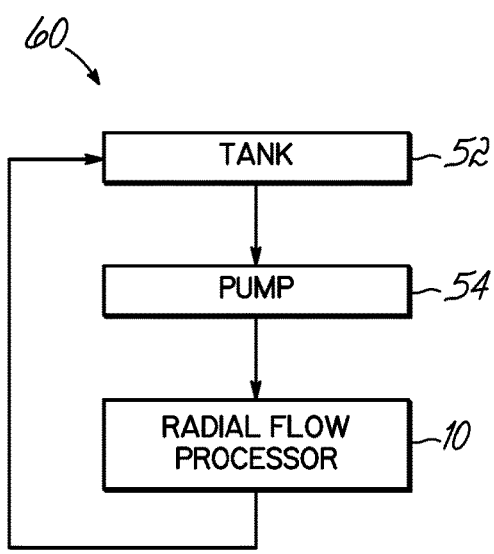
FIG. 4B is a schematic illustration of a recirculation loop flow configuration in accordance with the principles of the present invention.

In another embodiment, a radial flow processor 10 may be incorporated into a recirculation loop flow configuration 60, as shown in FIG. 4B. For example, a processing fluid may be drawn from a tank 52 by a pump 54, such as a centrifugal pump. The processing fluid may be pumped into a radial flow processor 10, where the fluid jet may impact upon the tip 20 of a conical diffuser 18. After the fluid passes over the conical diffuser 18, the fluid may exit the radial flow processor 10 via outlet apertures 36. The fluid may then be recirculated back to the tank 52, from which it may be again pumped by the pump 54 to the radial flow processor 10 for additional processing.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in numerous combinations depending on the needs and preferences of the user. There may be many variations of the design parameters which may be preferred, and the combination to be used will depend on preferences of the end user (e.g. pump performance parameters). Thus, alternative design parameters and methods of selecting design parameters may be used without departing from the spirit and scope of the present invention.

What is claimed is:

1. A liquid treatment apparatus for processing a liquid, comprising:
    an inlet nozzle including an orifice for directing a flow of liquid fluid through the orifice to define a fluid jet; and
    a conical diffuser including a tip, a base portion, and a curved surface therebetween, wherein the conical diffuser is generally aligned with the orifice such that the fluid jet impacts upon the tip of the conical diffuser, wherein the curvature of the curved surface is selected to maintain a substantially constant Froude number of the liquid along the conical diffuser, wherein a profile of the conical diffuser, when viewed in cross section, is defined by a quarter of an ellipse, and wherein the ellipse is defined by the following equations:

$$a = r_0 \times \sqrt[5]{\frac{Fr^8}{2}}$$

$$b = \frac{a^2}{r_0 \times Fr^2}$$

where a=the major radius of the ellipse
b=the minor radius of the ellipse
$r_0$=the radius of the orifice
Fr=the desired Froude number.

2. The liquid treatment apparatus of claim 1, wherein the inlet nozzle includes a curved inlet wall.

3. The liquid treatment apparatus of claim 1, wherein the base portion includes a rear wall on a side of the base portion opposite to the tip that is generally planar.

4. The liquid treatment apparatus of claim 1, wherein the base portion includes a rear wall on a side of the base portion opposite to the tip that is generally curved, the curved rear wall having a substantially constant radius of curvature.

5. The liquid treatment apparatus of claim 1, further comprising a mounting plate to which the conical diffuser is mounted, the mounting plate including one or more apertures for allowing liquid to pass through the mounting plate.

6. The liquid treatment apparatus of claim 1, wherein the liquid treatment apparatus includes a plurality of inlet nozzles and a plurality of conical diffusers, each conical diffuser being generally aligned with a corresponding orifice of an inlet nozzle.

7. The liquid treatment apparatus of claim 1, wherein a surface of the liquid treatment apparatus is constructed of or coated with a material selected from nickel, platinum, or copper for promoting a chemical reaction in the liquid fluid.

8. A system for processing a liquid, comprising:
    a tank for holding a liquid medium;
    a pump; and
    a liquid treatment apparatus according to claim 1, wherein the pump is configured to direct the liquid in the tank through the liquid treatment apparatus.

9. The system of claim 8, further comprising a recirculation loop for directing liquid treated by the liquid treatment apparatus back to the tank.

10. A method of treating a liquid, comprising:
    directing a flow of liquid through an orifice to define a fluid jet;
    impacting the fluid jet upon a conical diffuser having a tip, a base portion, and a curved surface therebetween; and
    maintaining a substantially constant Froude number as the liquid flows from the tip toward the base portion of the conical diffuser by selecting the curvature of the curved surface and defining a profile of the conical diffuser, when viewed in cross section, to be a quarter of an ellipse, and wherein the ellipse is defined by the following equations:

$$a = r_0 \times \sqrt[5]{\frac{Fr^8}{2}}$$

$$b = \frac{a^2}{r_0 \times Fr^2}$$

where a=the major radius of the ellipse
b=the minor radius of the ellipse
$r_0$=the radius of the orifice
Fr=the desired Froude number.

11. The method of claim 10, further comprising:
    (a) pumping a supply of liquid from a tank to the orifice;
    (b) directing the liquid that has impacted the conical diffuser back to the tank; and
    (c) repeating steps (a) and (b).

12. A liquid treatment apparatus for processing a liquid, comprising:
    an inlet nozzle including an orifice for directing a flow of liquid fluid through the orifice to define a fluid jet; and
    a conical diffuser including a tip, a base portion, and a curved surface therebetween, wherein the conical diffuser is generally aligned with the orifice such that the fluid jet impacts upon the tip of the conical diffuser, wherein the curvature of the curved surface is selected to maintain a substantially constant Froude number of the liquid along the conical diffuser, and wherein the base portion includes a rear wall on a side of the base portion opposite to the tip that is generally curved, the curved rear wall having a substantially constant radius of curvature.

13. A liquid treatment apparatus for processing a liquid, comprising:
    an inlet nozzle including an orifice for directing a flow of liquid fluid through the orifice to define a fluid jet;
    a conical diffuser including a tip, a base portion, and a curved surface therebetween, wherein the conical diffuser is generally aligned with the orifice such that the fluid jet impacts upon the tip of the conical diffuser, and wherein the curvature of the curved surface is selected to maintain a substantially constant Froude number of the liquid along the conical diffuser; and
    a mounting plate to which the conical diffuser is mounted, the mounting plate including one or more apertures for allowing liquid to pass through the mounting plate.

* * * * *